United States Patent [19]

Sekiya et al.

[11] 4,148,015

[45] Apr. 3, 1979

[54] ELECTRONIC TIMEPIECE WITH AN ELECTROCHROMIC DISPLAY

[75] Inventors: Fukuo Sekiya; Heihachiro Ebihara; Katsuo Nishimura, all of Tokorozawa, Japan

[73] Assignee: Citizen Watch Co., Ltd., Tokyo, Japan

[21] Appl. No.: 733,491

[22] Filed: Oct. 18, 1976

[30] Foreign Application Priority Data

Oct. 24, 1975 [JP] Japan .................. 50/127923
Oct. 28, 1975 [JP] Japan .................. 50/128872

[51] Int. Cl.² ........................................ G09F 9/32
[52] U.S. Cl. ........................... 340/763; 307/200 B; 340/811; 350/357; 58/23 BA
[58] Field of Search ............ 340/324 M, 336; 350/160 R, 357, 363; 307/200 B, 237

[56] References Cited

U.S. PATENT DOCUMENTS

| | | | |
|---|---|---|---|
| 3,096,271 | 7/1963 | Hespenheide | 340/324 R |
| 3,407,339 | 10/1968 | Booher | 307/200 B |
| 3,652,149 | 3/1972 | Rogers | 340/324 R |
| 3,938,131 | 2/1976 | Van Doorn et al. | 340/324 R |
| 3,950,077 | 4/1976 | Jasinski | 340/324 R |
| 3,987,433 | 10/1976 | Kennedy | 340/324 M |
| 3,999,205 | 12/1976 | Stewart | 307/200 B |
| 4,034,550 | 7/1977 | Kouchi et al. | 350/160 R |
| 4,057,739 | 11/1977 | Otake | 350/160 R |
| 4,061,928 | 12/1977 | Kessler | 307/200 B |

*Primary Examiner*—Marshall M. Curtis
*Attorney, Agent, or Firm*—Frank J. Jordan

[57] ABSTRACT

A driver circuit for an electrochromic display device for an electronic timepiece. In a first preferred embodiment, drive signals are applied through a plurality of source follower first and second metal oxide semiconductor field effect transistors to segment electrodes of the electrochromic display device. The first and second transistors have source electrodes connected together and also connected to the segment electrode to lower the voltage being applied across the segment electrode and a common electrode to drive the display device at a lower voltage. In a second preferred embodiment, the common electrode of the display device is alternately coupled to the high and low potentials of the battery by means of an inverter circuit composed of source follower transistors, which function to reduce the voltage being applied across the segment electrodes and the common electrode.

4 Claims, 11 Drawing Figures

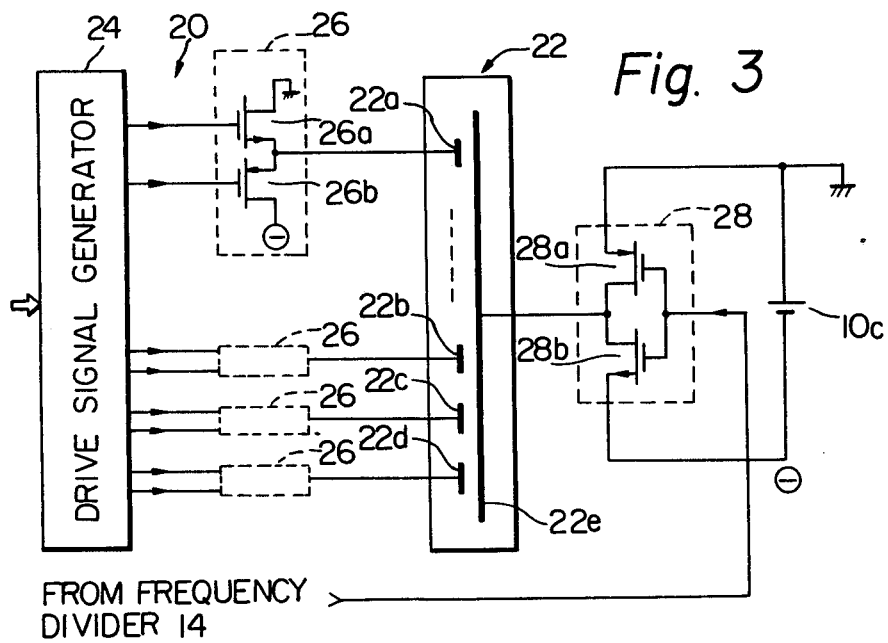
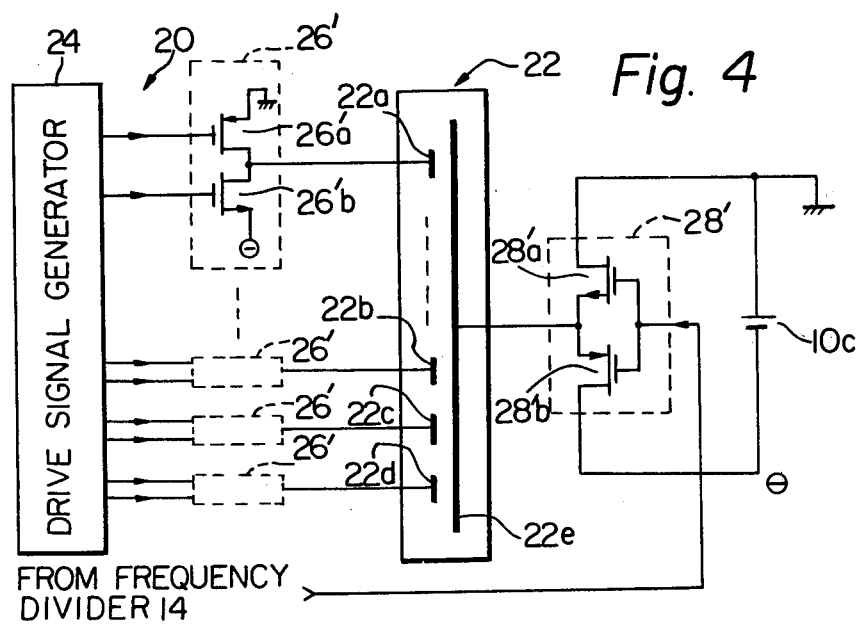

ELECTRONIC TIMEPIECE WITH AN ELECTROCHROMIC DISPLAY

This invention relates in general to driver circuits for electro-optical display devices and, more particularly, to a driver circuit for an electrochromic display device.

As is well known in the art, it has heretofore been proposed to provide a driver circuit for an electrochromic display device. The driver circuit is arranged to apply a voltage to each segment of the display device to cause the segment to provide a colored state for thereby indicating a desired numeral. The segment which has attained the colored state remains in its colored state due to its persistence effect. To bleach the segment, the segment is applied with a voltage of a reversed polarity. In a prior art driver circuit, the segment is applied with a voltage directly from a battery whose output voltage is excessively high for an electrochromic material. Thus, the life of the electrochromic display device is shortened. It is desired that the electrochromic display device have a longer life especially in a case where the electrochromic display device is employed in a digital electronic timepiece.

It is therefore an object of the present invention to provide an improved driver circuit for an electrochromic display device.

It is another object of the present invention to provide an improved driver circuit which is capable of driving an electrochromic display device so as to increase the life thereof.

It is another object of the present invention to provide an improved driver circuit for an electrochromic display device, which driver circuit is simple in construction and highly reliable in operation.

These and other objects, features and advantages of the present invention will become apparent from the following description when taken in conjunction with the accompanying drawings, in which:

FIG. 3 is a modified form of the driver circuit shown in FIG. 2;

FIG. 4 is another preferred embodiment of the driver circuit according to the present invention;

Figure 1:
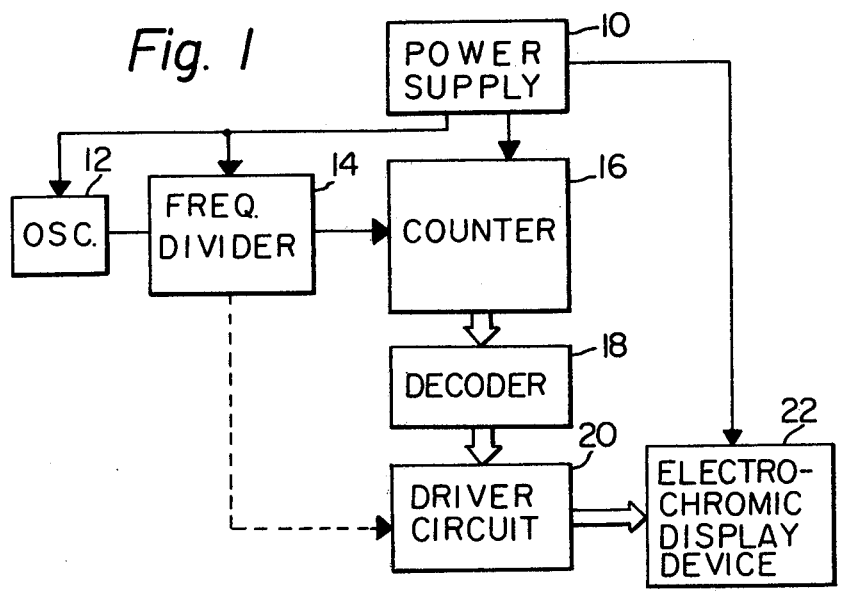
FIG. 1 is a block diagram of an example of an electronic timepiece to which a driver circuit according to the present invention can be applied.

Referring now to FIG. 1, there is shown a block diagram of an example of an electronic timepiece incorporating a driver circuit according to the present invention. As shown, the electronic timepiece comprises a power supply 10 such as a commercially available d.c. battery, to which a crystal controlled oscillator 12 is coupled to receive power. The oscillator 12, which provides a 32,768 Hz signal, is well known and a detailed description of the same is herein omitted. This signal is applied to a frequency divider 14, which divides it down to produce a 1 Hz signal which is applied to a counter circuit 16. The frequency divider 14 may also produce a train of clock pulses of a relatively higher frequency, which is applied to a driver circuit 20 to control a display device 22 in a manner as will be described in detail later. The counter circuit 16 is responsive to the 1 Hz signal and generates output signals for the seconds, minutes, hours and calendar data. Logic means, though not shown, are coupled to the counter circuit to reset the seconds, minutes, hours and date. The output of the counter circuit 16 is applied to a decoder 18, which in turn generates decoded signals, namely, display information signals. The decoded signals are applied to the driver circuit 20, which generates drive signals related to the decoded signals. The drive signals are applied to the electrochromic display device 22 to which the power supply 10 is connected, to display time information.

Figure 2:
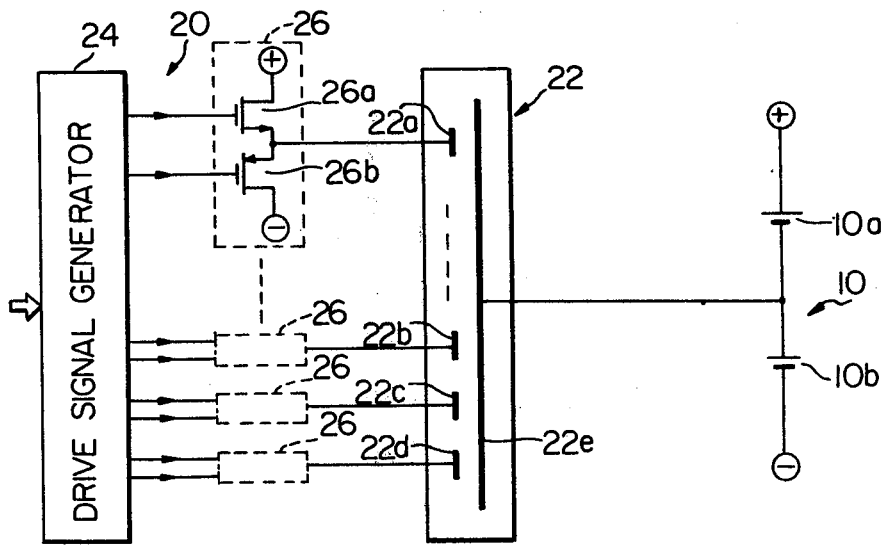
FIG. 2 is a preferred embodiment of a driver circuit according to the present invention.

FIG. 2 shows a preferred embodiment of the driver circuit 20 according to the present invention. As shown, the driver circuit 20 comprises a drive signal generator 24 arranged to generate drive signals indicative of time or calendar information, and a plurality of switching circuits 26 coupled at their outputs to segment electrodes 22a, 22b, 22c and 22d of the electrochromic display device 22. The drive signal generator 24 may be of the type described in detail in a copending U.S. Patent application Ser. No. 715,523 entitled "Driver circuit for driving electrochromic display device" which will be assigned to the same assignee, and, therefore, a detailed description of the same is herein omitted for the sake of simplicity of description. Each of the switching circuits 26 comprises an N-channel metal oxide semiconductor field effect transistor (N-channel MOSFET) 26a and a P-channel metal oxide semiconductor field effect transistor (P-channel MOSFET) 26b. The drain terminal of the N-channel MOSFET 26a is coupled to the positive potential side of the power supply. The source terminals of the N-channel MOSFET 26a and the P-channel MOSFET 26b are coupled together to constitute an output of the switching circuit 26. The drain terminal of the P-channel MOSFET 26b is coupled to the negative potential side of the power supply. It will thus be seen that the N-channel MOSFET 26a and the P-channel MOSFET 26b are connected as source follower circuit and serve as a voltage control circuit. The gate terminals of the N-channel MOSFET 26a and the P-channel MOSFET 26b are coupled to outputs of the drive signal generator 24 to receive drive signals as inputs therefrom. Each output of the switching circuits 26 is connected to each segment electrode of the electrochromic display device 22. The common electrode 22e of the electrochromic display device 22 is coupled to the power supply 10. The power supply 10 is shown as including first and second batteries 10a and 10b connected in series.

When the drive signals from the drive signal generator 24 go to a low level, the N-channel MOSFET 26a is turned off while the P-channel MOSFET 26b is turned on. Since, in this case, the P-channel MOSFET 26b is connected as the source follower, the potential at the source terminal of the P-channel MOSFET 26b becomes higher than that of the negative potential side of the power supply by an amount equal to the threshold voltage $V_{th}$ of the P-channel MOSFET 26b. Consequently, the segment electrode 22a is applied with a voltage lower than the output voltage V of the battery 10b and attains a colored state. When the drives signal applied to the gate terminal of the P-channel MOSFET 26b goes to a high level while the drive signal applied to the gate terminal of the N-channel MOSFET 26a remains at a low level, both of the N-channel MOSFET 26a and the P-channel MOSFET 26b are turned off. In this situation, the segment electrode 22a remains in its colored state due to its persistence effect. When the drive signals applied to the gate terminals of the N-channel MOSFET 26a and the P-channel MOSFET 26b go to a high level, the N-channel MOSFET 26a is turned on while the P-channel MOSFET 26b is turned off. Since, in this case, the N-channel MOSFET 26a is connected as a source follower, the potential at the source terminal of the N-channel MOSFET 26a is lower than the output voltage V' of the battery 10a by an amount equal to the threshold voltage $V'_{th}$ of the N-channel MOSFET 26a. Thus, the segment electrode 22a is applied with a voltage lower than the output voltage V' of the battery 10a by the amount equal to the threshold voltage $V'_{th}$ and attains a bleached state.

FIG. 3 shows a modified form of the driver circuit shown in FIG. 2, with like components bearing like reference numerals as those used in FIG. 2. In this modification, the drain terminal of the N-channel MOSFET 26a is grounded, and the power supply comprises a single battery 10c having its positive terminal grounded. In addition, the driver circuit further comprises a second switching circuit 28 coupled to the common electrode 22e of the electrochromic display device 22. The second switching circuit 28 comprises a complementary pair of transistors including a P-channel MOSFET 28a and an N-channel MOSFET 28b connected between the grounded side or positive side and the negative side of the battery 10c. The drain terminals of the MOSFETs 28a and 28b are connected together and coupled to the common electrode 22e of the electrochromic display device 22. The gate terminals of the MOSFETs 28a and 28b are connected together and receives a train of clock pulses from the frequency divider 14. To color the segment electrode 22a, the clock pulse goes to a low level while the drive signal applied to the gate terminal of the P-channel MOSFET 26b of the switching circuit 26 goes to a low level. In this condition, the P-channel MOSFET 28a of the switching circuit 28 is turned on so that the common electrode 22e is connected to the ground. On the other hand, the P-channel MOSFET 26b of the switching circuit 26 is turned on. Under these conditions, the segment electrode 22a is applied with a voltage in a coloring direction. To bleach the segment electrode 22a, the clock pulse applied to the input of the switching circuit 28 goes to a high level and the drive signal applied to the gate terminal of the N-channel MOSFET 26a goes to a high level, i.e., ground level. In this condition, the N-channel MOSFET 28b of the switching circuit 28 is turned on so that the common electrode 22e is coupled to the negative potential side of the battery 10c. On the other hand, the N-channel MOSFET 26a is turned on so that the segment electrode 22a is connected to the ground. Under these conditions, the segment electrode 22a is applied with a voltage in a bleaching direction. In this case, the voltage applied to the segment electrode 22a is lower than the output voltage of the battery 10c by an amount equal to the threshold voltage of the N-channel MOSFET 26a. In this manner, each of the segment electrodes of the electrochromic display device 22 is applied with a voltage lower than the output voltage of the power supply so that the life of the electrochromic display device is increased and the power consumption can be reduced. Since, further, the switching circuit 26 functions to reduce the level of a voltage to be applied to the segment electrodes of the electrochromic display device 22, a number of level shifter circuits can be reduced.

FIG. 4 illustrates another preferred embodiment of the driver circuit according to the present invention. In this illustrated embodiment, a switching circuit 26' comprises a P-channel MOSFET 26'a and an N-channel MOSFET 26'b. The source terminal of the P-channel MOSFET 26'a is grounded, and the source terminal of the N-channel MOSFET 26'b is connected to the negative potential side of the battery 10c. In addition, a second switching circuit 28' comprises an N-channel MOSFET 28'a and a P-channel MOSFET 28'b connected between the positive potential side or grounded side and the negative potential side of the battery 10c as source followers. In this embodiment, the switching circuit 28' serves as a voltage control circuit such that the electrochromic display device 22 is applied with a voltage lower than the output voltage of the power supply 10c.

Figure 5:
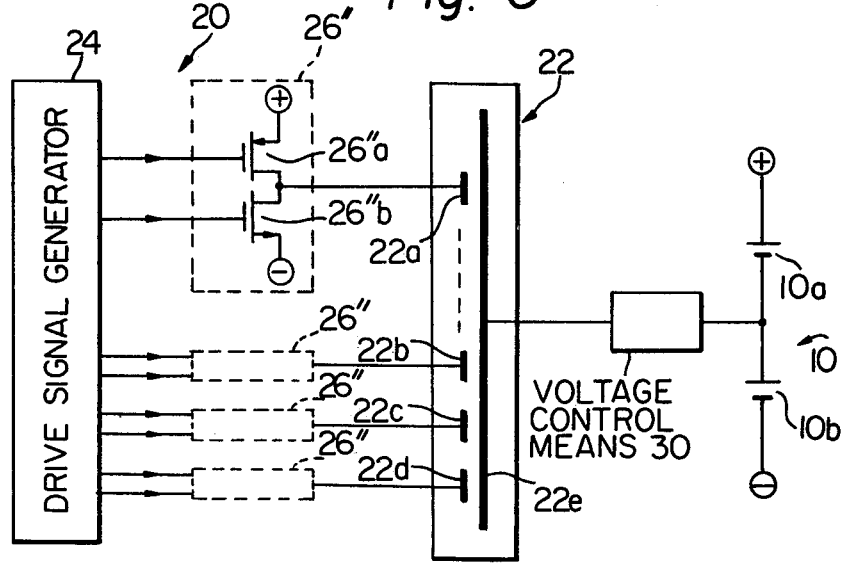
FIG. 5 is still another preferred embodiment of the driver circuit according to the present invention.

Still another preferred embodiment of the driver circuit according to the present invention is illustrated in FIG. 5, in which like or corresponding component parts are designated by the same reference numerals as those used in FIGS. 2 and 4. In this illustrated embodiment, a switching circuit 26" comprises a P-channel MOSFET 26"a and an N-channel MOSFET 26"b. The source terminal of the P-channel MOSFET 26"a is coupled to the positive potential side of the battery 10a, and the source terminal of the N-channel MOSFET 26"b is coupled to the negative potential side of the battery 10b. In addition, a voltage control means 30 is connected in series between the common electrode 22e of the electrochromic display device 22 and a junction between the batteries 10a and 10b.

With the arrangement mentioned above, when the P-channel MOSFET 26"a is turned off and the N-channel MOSFET 26"b is turned on in response to drive signals from the drive signal generator 24, a voltage is applied across the segment electrode 22a and the common electrode 22e through the voltage control means 30 in a coloring direction. In this case, the voltage applied to the segment electrode 22a is reduced to a value lower than that of the battery 10b by the action of the voltage control means 30. Under these circumstances, the segment electrode 22a remains in its colored state due to its persistence effect even though the P-channel MOSFET 26"a and the N-channel MOSFET 26"b are turned off in response to the drive signals from the drive signal generator 24.

When, now, the P-channel MOSFET 26"a is turned on while the N-channel MOSFET 26"b is turned off in response to drive signals, a voltage is applied across the segment electrode 22a and the common electrode 22e through the voltage control means 30 in a bleaching direction. In this case, the voltage applied to the segment electrode 22a is lower than that of the battery 10a.

Figure 6:
FIG. 6 is an example of a voltage control means forming part of the driver circuit shown in FIG. 5.

FIG. 6 shows an example of the voltage control means 30 shown in FIG. 5. In FIG. 6, the voltage control means 30 comprises a resistor 32. In a case where the resistor 32 is used as a voltage control means, it is possible to control the level of the voltage to be applied to the electrochromic display device 22 by varying the resistance value of the resistor.

Figure 7:
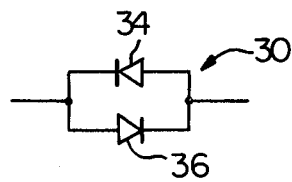
FIG. 7 is another example of the voltage control means shown in FIG. 5.

FIG. 7 shows another example of the voltage control means 30 shown in FIG. 6. In this example, the voltage control means 30 comprises first and second diodes 34 and 36 connected in a ring configuration. In a case where the diodes 34 and 36 are used as a voltage control means, a voltage is applied to the electrochromic display device 22 in a coloring direction through the diode 34 and in a bleaching direction through the diode 36. In these cases, the voltage to be applied to the electrochromic display device 22 is reduced to a lower value than the output voltage of the battery 10a or 10b by a value equal to the forward voltage of the diode 34 or 36.

Figure 8:
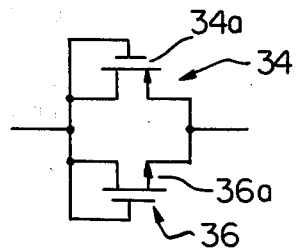
FIGS. 8, 9 and 10 show examples of diodes shown in FIG. 7.

FIG. 8 shows an example of diodes 34 and 36 shown in FIG. 7. In FIG. 8, the diodes 34 and 36 comprise a P-channel MOSFET 34a and an N-channel MOSFET 36a, respectively. The source terminals of the MOSFETs 34a and 36a are coupled together and connected to the junction between the batteries 10a and 10b (see FIG. 5). The drain terminals and gate terminals of the MOSFETs 34a and 36a are also coupled together and connected to the common electrode 22e of the electrochromic display device 22. In this case, the voltage applied to the electrochromic display device 22 is lower than the output voltage of the batteries 10a or 10b by an amount equal to the threshold voltage of the MOSFETs 34a or 36a.

Figure 9:
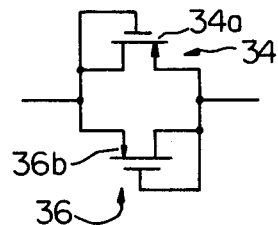

FIG. 9 shows a case in which the diodes 34 and 36 comprise P-channel MOSFETs 34a and 36b, respectively.

Figure 10:
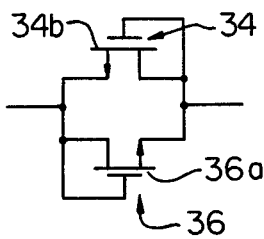

FIG. 10 shows a case in which the diodes 34 and 36 comprise N-channel MOSFETs 34b and 36a, respectively.

It should be understood that in a case where the diodes are constituted by the MOSFETs as shown in FIGS. 8, 9 and 10 it is easy to incorporate the diodes into an integrated circuit chip and adjust the level of the voltage to be applied to the electrochromic display device by appropriately setting the threshold voltage to a predetermined value. While in the examples of FIGS. 7, 8, 9 and 10 the voltage control means is shown as comprising a single diode in each direction, it should be noted that more than one diodes may be connected in series in each direction.

Figure 11:
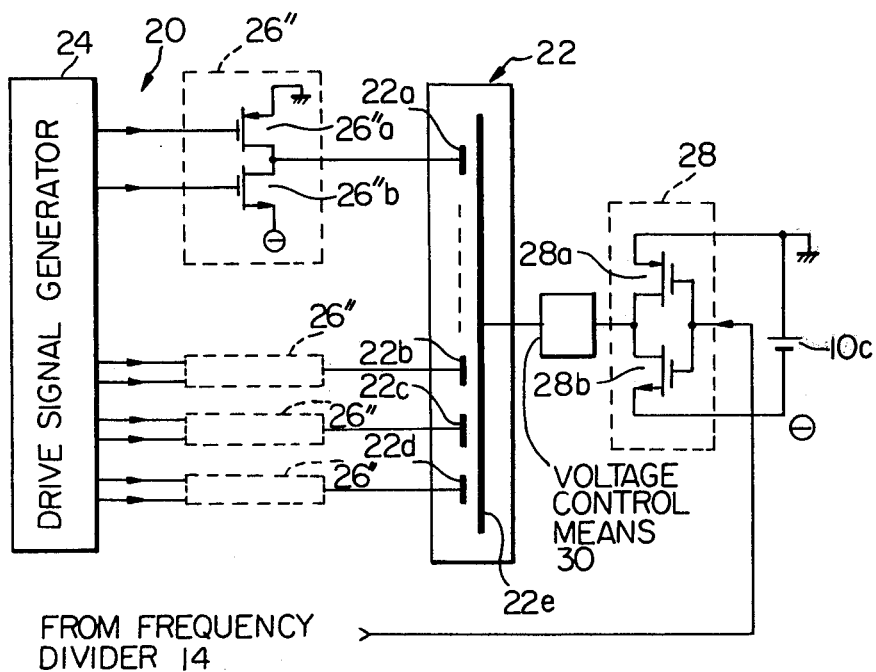
FIG. 11 is a modified form of the driver circuit shown in FIG. 5.

A modified form of the driver circuit shown in FIG. 5 is illustrated in FIG. 11 in which the driver circuit is arranged to be driven by a single battery 10c. In this modification, the source terminal of the P-channel MOSFET 26"a is connected to the ground, and a second switching circuit 28 is connected between the voltage control means 30 and the single battery 10c. The second switching circuit 28 is identical in arrangement with the second switching circuit shown in FIG. 3 and, therefore, a detailed description of the same is herein omitted. As previously described, the gate terminals of the MOSFETs 28a and 28b are coupled together and adapted to receive a train of clock pulses from the frequency divider of the timepiece. When the clock pulse goes to a low level while the drive signal applied to the gate terminal of the N-channel MOSFET 26"b goes to a high level, the P-channel MOSFET 28a is turned on and the N-channel MOSFET 26"b is turned on. In this condition, a voltage is applied through the P-channel MOSFET 28a and the voltage control means 30 across the common electrode 22e and the segment electrode 22a in a coloring direction. When, in contrast, the clock pulse goes to a high level while the drive signal applied to the gate terminal of the P-channel MOSFET 26"a goes to a low level, the N-channel MOSFET 28b is turned on and the P-channel MOSFET 26"a is turned on. In this condition, a voltage is applied across the segment electrode 22a and the common electrode 22e in a bleaching direction.

It will now be appreciated from the foregoing description that a driver circuit according to the present invention makes it possible to apply a voltage to an electrochromic display device which is lower than an output voltage of a power supply whereby the power consumption can be reduced and the life of the electrochromic display device can be increased.

It should be noted that a driver circuit of the present invention is so arranged as to reduce the level of a voltage to be applied to an electrochromic display device it is unnecessary to employ level shifter circuits which are complicated in construction.

While the present invention has been shown and described with reference to particular embodiments in which the driver circuit employs MOSFETs as switching elements, it should be noted that the MOSFETs may be replaced with bipolar transistors, if desired.

1. A driver circuit for an electrochromic display device for an electronic timepiece and having segment electrodes and a common electrode connected to a power supply having high and low potentials, comprising:
  means for generating drive signals; and
  a plurality of first and second metal oxide semiconductor field effect transistors having their drain electrodes connected to the high and low potentials of said power supply and having their source electrodes connected together and also connected to the segment electrodes of the electrochromic display device, respectively, and operative to apply a voltage from the power supply across the segment electrodes and the common electrode in coloring and bleaching directions in response to said drive signals, each of said plurality of first and second transistors being operative to control the level of the voltage to be applied across the segment electrode and the common electrode to a value lower than an output voltage of the power supply.

2. A driver circuit according to claim 1, in which said electronic timepiece has a source of clock pulses, and said power supply comprises a single battery, and further comprising inverter circuit means connected between the common electrode and said single battery, said inverter circuit means being operative in response to said clock pulses to alternately connect said common electrode to the high and low potentials of said power supply.

3. A driver circuit according to claim 2, in which said inverter circuit means comprises a complementary pair of transistors coupled between the positive potential side and the negative potential of said single battery.

4. A driver circuit for an electrochromic display device for an electronic timepiece powered by a single battery having a high and low potential, and a source of clock pulses, with the display device having segment electrodes and a common electrode, comprising:
  means for generating drive signals;
  a plurality of first and second metal oxide semiconductor field effect transistors serving as switching circuit means and having source electrodes connected to the high and low potentials of the single battery and drain electrodes connected together and also connected to the segment electrodes of the electrochromic display device, respectively, and operative to apply a voltage from said single battery across the segment electrodes and the common electrode in coloring and bleaching directions in response to said drive signals; and inverter circuit means for alternately connecting said common electrode to the high and low potentials of said single battery in response to said clock pulses, said inverter circuit means including first and second source follower connected metal oxide semiconductor field effect transistors arranged to reduce the level of the voltage to be applied across the segment electrodes and the common electrode to a value lower than an output voltage of said single battery.

* * * * *